(12) United States Patent
Blyler, Jr. et al.

(10) Patent No.: US 6,636,672 B1
(45) Date of Patent: Oct. 21, 2003

(54) SYSTEM COMPRISING PLASTIC OPTICAL FIBER

(75) Inventors: Lee L. Blyler, Jr., Basking Ridge, NJ (US); George John Shevchuk, Old Bridge, NJ (US); Whitney White, Summit, NJ (US)

(73) Assignee: Fitel USA Corp, Norcross, GA (US)

( * ) Notice: Subject to any disclaimer, the term of this patent is extended or adjusted under 35 U.S.C. 154(b) by 0 days.

(21) Appl. No.: 09/349,191

(22) Filed: Jul. 7, 1999

(51) Int. Cl.[7] ............................. G02B 6/36; G02B 6/38
(52) U.S. Cl. ............................. 385/50; 385/76; 385/77; 385/147
(58) Field of Search ................. 264/1.24, 1.25, 264/1.26; 225/96; 385/95, 134, 136, 137, 96–98

(56) References Cited

U.S. PATENT DOCUMENTS

| | | | |
|---|---|---|---|
| 4,573,617 A | * | 3/1986 | Durkow ........................ 225/96 |
| 4,582,392 A | * | 4/1986 | Williams et al. ............ 350/96.2 |
| 4,953,940 A | * | 9/1990 | Lanzetta, Jr. et al. ...... 350/96.2 |
| 5,097,522 A | | 3/1992 | Tackett et al. |
| 5,226,995 A | | 7/1993 | White |
| 5,230,032 A | | 7/1993 | Muzslay |
| 5,410,627 A | | 4/1995 | Hultermans |
| 5,460,311 A | * | 10/1995 | Fan ............................... 225/96 |
| 5,487,121 A | | 1/1996 | Miesak |
| 5,633,969 A | | 5/1997 | Jennings et al. |
| 5,671,311 A | | 9/1997 | Stillie et al. |
| 5,770,132 A | * | 6/1998 | Yamamura et al. ......... 264/1.25 |
| 6,256,448 B1 | * | 7/2001 | Shahid ........................ 385/147 |

* cited by examiner

Primary Examiner—Frank G. Font
Assistant Examiner—Michael P. Mooney
(74) Attorney, Agent, or Firm—Peter V. D. Wilde

(57) ABSTRACT

The invention relates to plastic optical fiber (POF) processes and systems and involves improved non-polishing termination techniques. The techniques provide good physical and optical characteristics, i.e., smoothness, at the termination point, thereby providing lower losses than conventionally obtained. According to one embodiment, POF is cut while the fiber is under compression. According to another embodiment, the POF is notched and then pulled at a relatively high strain rate to induce fracture. The rate is such that the strain remains in the elastic region, i.e., the fiber exhibits brittle, as opposed to ductile, behavior during the strain. The brittle behavior provides a smooth termination surface, as opposed to a plastically-deformed surface.

15 Claims, 3 Drawing Sheets

SYSTEM COMPRISING PLASTIC OPTICAL FIBER

BACKGROUND OF THE INVENTION

1. Field of the Invention

The invention relates to plastic optical fiber.

2. Discussion of the Related Art

Glass optical fiber has become a significant transmission medium in recent years, particularly for long distance transmission applications. Such optical fiber has not found significant usage, however, in smaller scale applications, such as distribution of fiber to the desk in local area networks. In particular, glass optical fiber has not been as cost effective as, for example, copper wire, and also requires extremely precise fiber connections, e.g., end face polishing, alignment, and index-matching material. There has been interest, therefore, in pursuing plastic optical fiber (POF), which offers many of the benefits of glass optical fiber, but is expected to offer more cost effective systems. POF also offers some unique characteristics, including a larger core and desirable dispersion properties, which are expected to make connection and splicing easier.

However, connectivity approaches, e.g., termination and connection techniques, used for glass optical fiber are not necessarily desirable for plastic optical fiber. Yet, such basic issues with respect to plastic optical fiber systems must be resolved in order for POF to achieve commercial acceptance. For example, current POF connections tend to exhibit undesirably high losses, e.g., 2 to 3 dB. Thus, improved techniques for terminating POF are desired, advantageously techniques that result in low-loss connections.

SUMMARY OF THE INVENTION

The invention relates to POF processes and systems and involves improved termination techniques that make dry, non-polished connection more acceptable. The techniques provide good physical characteristics, i.e., smoothness, at the termination end face, thereby providing lower loss connections than conventionally obtained. For example, losses less than 1 dB have been obtained without polishing or index-matching material, e.g., for CYTOP® fiber having a polymethylmethacrylate reinforcement (CYTOP® is poly (perfluoro-butenyl vinyl ether), and is available commercially from Asahi Glass Co., Japan).

According to one embodiment, POF is cut while the fiber is under axial compression, and the usable piece (or pieces) is typically removed prior to pulling back the blade or knife. The resulting termination exhibits a smooth surface that promotes low loss in a dry, non-polished connection. According to another embodiment, the POF is cleaved. Specifically, the fiber is notched and then pulled at a relatively high strain rate to induce fracture. The rate is such that the strain remains in the elastic region up to and during fracture, i.e., the fiber exhibits brittle, as opposed to ductile, behavior during the strain and fracture. The brittle behavior is necessary for a smooth termination surface that similarly promotes low loss in a dry, non-polished connection.

These techniques of the invention overcome problems discovered to be inherent in prior, conventional cutting and cleaving techniques. For example, cleaving with slow strain rates led to poor surfaces not suitable for connection without further processing. And, significantly, cutting in tension or even in non-compression, was found to lead to branching cracks within the fiber, i.e., cracks propagating into the fiber from the end face. Branching cracks in particular are believed to contribute to the relatively high losses currently found in POF connections. The invention, by providing improved termination and thus easier, lower-loss connections, enhances the ability of POF to be incorporated into optical communication systems.

DETAILED DESCRIPTION OF THE INVENTION

Figure 1:
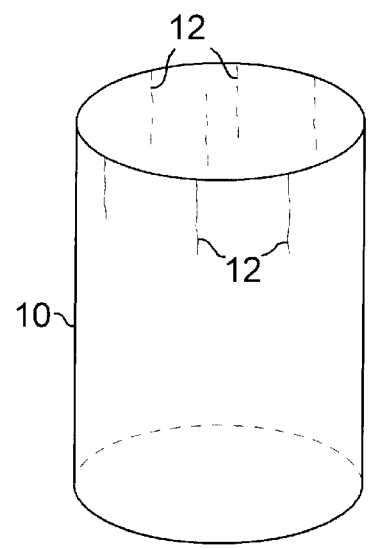
FIG. 1 illustrates branching cracks typically encountered with conventional termination techniques.

According to the invention, it is possible to provide non-polished POF terminations having improved physical and optical characteristics, e.g., smoothness, and thereby provide lower losses when preparing dry, non-polished connections. (Non-polished indicates that polishing of the terminated end faces is not performed prior to connection. Dry indicates that index-matching material is not used when making the connection.) It was discovered that conventional termination techniques tend to induce problems such as branching cracks in POF. As illustrated in the POF 10 shown in FIG. 1, branching cracks 12 run into the fiber 10 from the end face. The branching cracks 12 are believed to contribute to the undesirably high losses exhibited by POF connections. According to the invention, however, it is possible to terminate POF such that substantially no branching cracks are induced. (Substantially no branching cracks indicates that the actual loss measured in connection between two butt-coupled fibers with end faces prepared by a dry, non-polished preparation technique is less than ½ dB above the calculated loss for similar fibers with perfectly planar, crack-free end faces similarly butt-coupled by a dry, non-polished technique.)

According to one embodiment, POF is cut while the fiber is under axial compression, i.e., a compressive axial strain is applied prior to cutting. (It is also possible that, with some configurations, initiation of the cutting might itself induce the strain.) Typically, a compressive strain of approximately 1% is sufficient to provide a relatively smooth termination surface substantially free of branching cracks, although lower levels of strain are also suitable in some cases. The resulting usable piece (or pieces) is typically removed prior to pulling back the blade or knife, to avoid damaging the surface during such pull-back. It is possible to perform the cutting by any suitable technique, e.g., a guillotine method. Typically, a single cutting edge is used to terminate the fiber in a direction normal to the fiber axis. A conventional razor blade, e.g., as used for shaving, is generally suitable. Such blades tend to have a cutting edge with a radius of curvature substantially less than 10 $\mu$m, more typically substantially less than 1 $\mu$m.

Previous techniques of cutting under tension or with a free end of fiber under neither compression nor tension are believed to promote unstable fracture of the POF ahead of the cutting blade. Specifically, as the blade moves through the fiber, a crack propagates through the last portion of uncut fiber before the blade reaches that portion. The defects, e.g., branching cracks, induced by such crack propagation results in a poor surface that degrades the quality of a subsequent connection, particularly when the unstable fracture occurs in both the optically active and reinforcement portions of the fiber. However, by keeping the fiber under even a small compression, this crack propagation is substantially reduced, particularly over the optically active area of the fiber. The result is a smooth termination surface that leads to a lower loss connection, even without polishing. It may also be possible to substantially avoid the detrimental tension by using an extremely thin blade to make the cut. Such a thin blade, e.g., 20 $\mu$m, might avoid the need for axial compression.

A variety of tools are suitable for providing such compressive-fiber cutting. In the cutting tool 20 shown in FIG. 2, a fiber 21 is threaded through the tool 20 and clamped into a fixed clamp 22 at one end and a floating clamp 23 at the other end. The floating clamp 23 is pushed toward the fixed clamp 22, providing compression, and a blade 24 located in a housing 25 is pushed through the fiber 21. The cut fiber 21 is then unclamped and removed, typically before pulling back the blade 24.

Figure 3A:
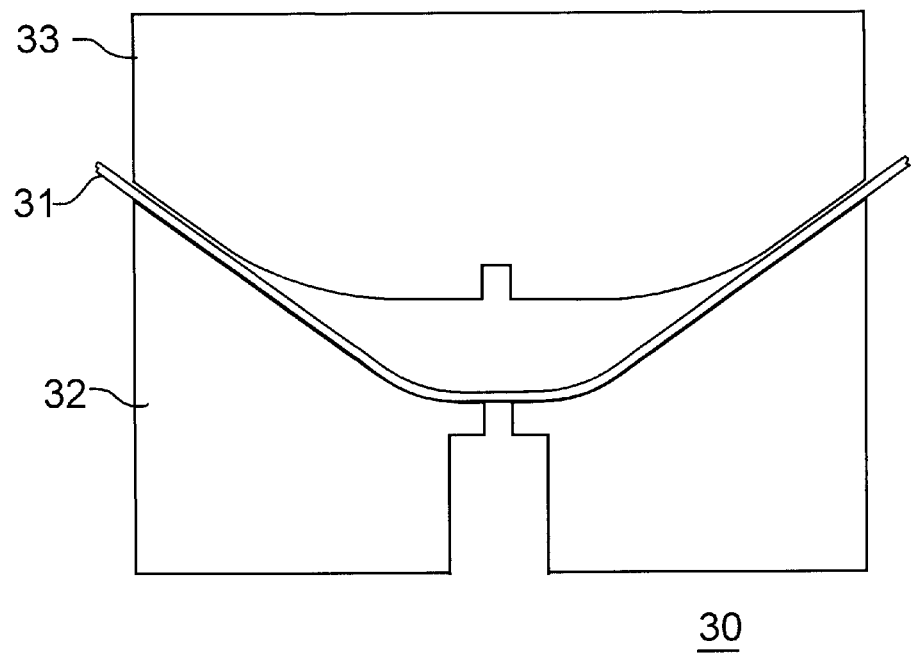
FIG. 3 illustrates a technique for terminating plastic optical fiber according to an embodiment of the invention.
Figure 3B:
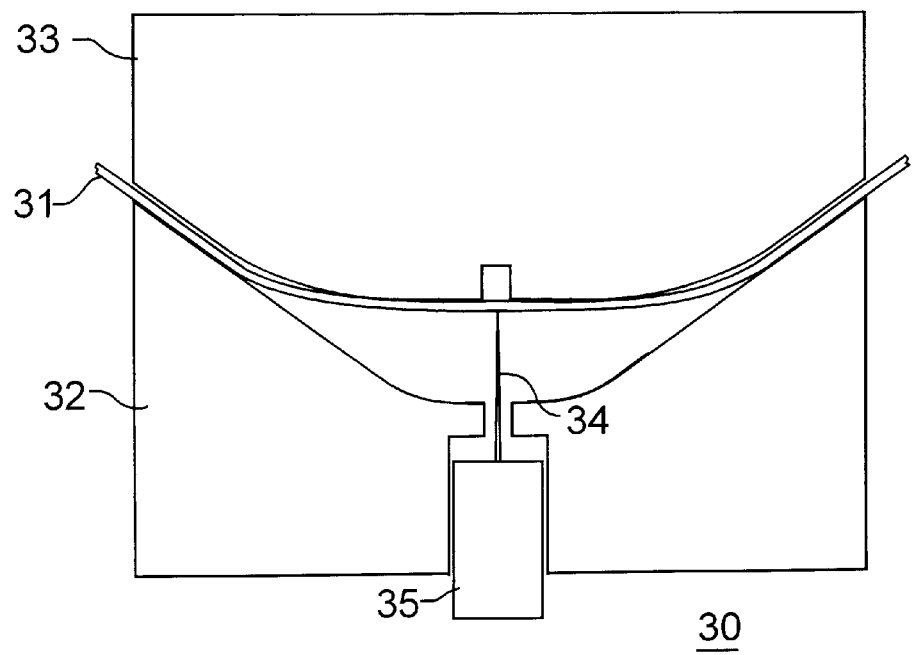

The cutting tool 30 shown in FIGS. 3A and 3B reflects a more general technique. Specifically, the tool 30 contains lower and upper portions 32, 33. The lower portion 32 defines a curvature onto which is placed a plastic optical fiber 31, which conforms to the curvature, as shown in FIG. 3A. The lower portion 32 and upper portion 33 are then brought together until the fiber 31 becomes clamped. A blade 34 located in a housing 35 is then inserted through an opening in the lower portion 32. As shown in FIG. 3B, the blade 34 contacts the curved fiber 21, pushes the fiber 21 against the upper portion 33, thereby decreasing the fiber's 21 length and inducing compression in the fiber 21. (The upper portion 33 is generally normal to the blade at the area where the fiber 21 contacts the upper portion 33.). With the fiber under compression, the blade then cuts into the fiber 21 to effect termination. The clamp is then opened, and the fiber is removed. The technique reflected in FIGS. 3A and 3B is useful with a variety of tools. In general, the technique involves orienting the clamped fiber such that the initial force of the blade induces the compression, and the continued force then cuts the fiber.

Figure 4:
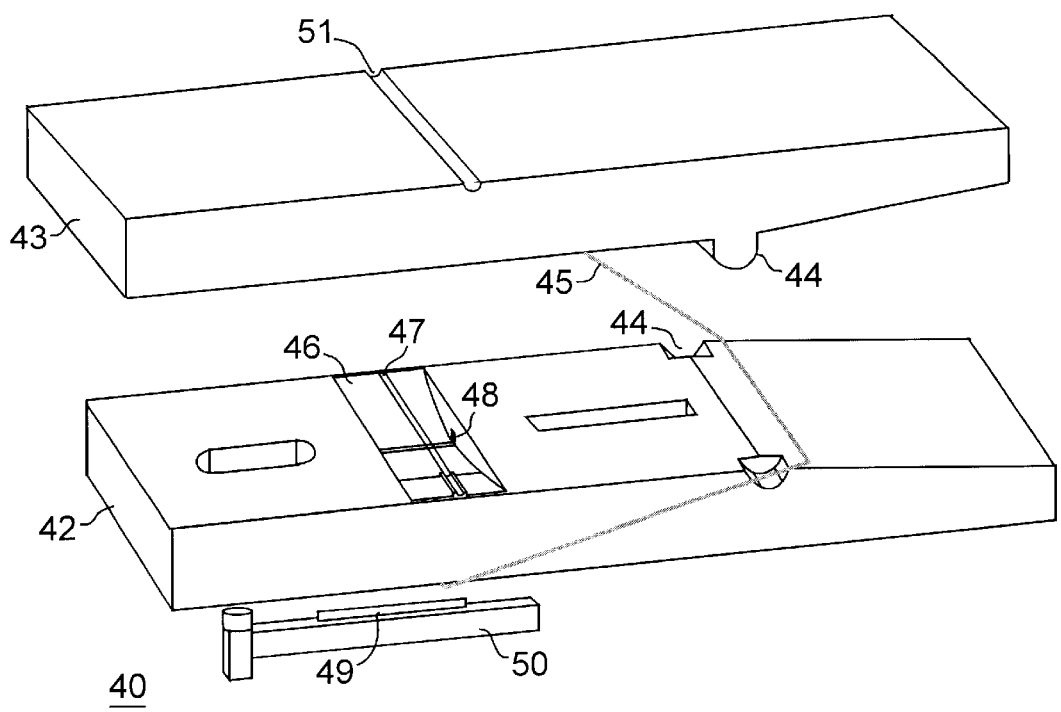
FIG. 4 illustrates a tool useful for practicing the technique reflected in FIG. 3.

A more detailed view of one embodiment of a tool of this type is shown in FIG. 4. The tool 40 contains an upper housing 43 and a lower housing 42, connected by a hinged mechanism 44 that includes a wire spring 45 (notch 51 in upper housing 43 is provided for accepting the upper portion (not shown) of the spring 45). The lower housing 42 contains a curved cavity 46, the cavity 46 including a similarly curved guide 47 for placement of a fiber therein. The cavity 46 further contains an opening 48 for the blade 49, which is located in a blade housing 50. The tool 40 operates as explained in regards to FIGS. 3A and 3B.

Figure 5:
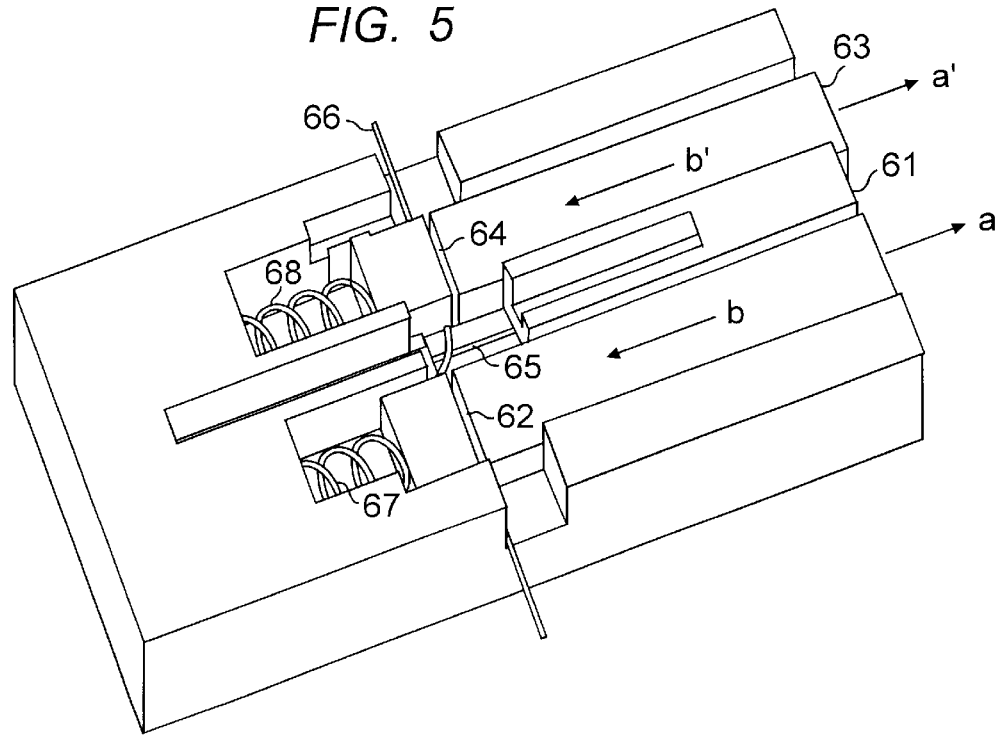
FIG. 5 illustrates another tool useful for terminating plastic optical fiber according to the invention.

Another tool suitable for inducing axial compression and then terminating a plastic optical fiber is shown in FIG. 5. The tool 60 contains a first plunger 61 having a first fiber guide area 62 and a second plunger 63 having a second fiber guide area 64. The tool 60 also contains a blade guide 65. To operate the tool, the first and second plungers 61, 63 are moved in the direction a and a', as shown in FIG. 5. Upon moving in direction a, a', the first and second guide areas 62, 64 open to freely accept a fiber 66. Once the fiber 66 is placed into the open guide areas 62, 64, the first plunger 61 is moved in direction b, which causes the first guide area 62 to close and thereby firmly fix the fiber 66. The movement in direction b of the first plunger 61 also induces movement of the closed first guide area 62 in direction b by compression of a first spring 67. This movement of the first guide area 62 induces a curvature and length increase in the portion of fiber 66 located between the first and second plungers, as shown in FIG. 5.

Once the first plunger 61 is locked in place, the second plunger 63 is similarly moved in direction b', which closes the second fiber guide area 64, fixing the fiber 66. The movement of the second plunger 63 in direction b' also moves the fixed fiber 66 in direction b', by compression of a second spring 68. This fixing of the fiber 66 in the second guide area 64 and subsequent movement of the fiber in the b' direction induces the desired axial compression of the fiber 66 in the area between the first and second guide areas 62, 64. This compressed portion of the fiber 66 is then cut with a blade (not shown) inserted into the blade guide 65.

According to another embodiment of the invention, the POF is cleaved. Specifically, the fiber is notched and then pulled at a relatively high strain rate to induce fracture. The rate is such that the strain remains in the elastic region of a stress-strain curve, i.e., the fiber exhibits brittle, as opposed to ductile, behavior during the strain, and exhibits very little plastic deformation, particularly in the optically active areas of the fiber. The brittle behavior provides a smooth termination surface, as opposed to a rough, plastically-deformed surface.

This result is obtained by a combination of relatively small radius of curvature of the notch and a relatively fast strain rate. Specifically, the radius of curvature of the notch is less than 10 $\mu$m, advantageously less than 1 $\mu$m, and more advantageously less than 0.1 $\mu$m. A strain rate of at least 1 sect$^{-1}$ is typically sufficient to attain a smooth, brittle fracture surface for a variety of notch sizes. However, depending on the notch size and the particular material, it is possible that lower strain rates, e.g., 0.1 sec$^{-1}$, or even 0.01 sect$^{-1}$ in the case of very small notch radii of curvature, would be suitable.

Cleavage is generally performed simply by notching a fiber with a blade, e.g., a razor blade, by a guillotine or sawing motion, fixing one end of the fiber, and pulling the other end to induce fracture. It is also possible to secure and pull both ends in opposite directions to induce fracture. The notch is typically made to a depth of about 10 to about 30% of the diameter of the plastic optical fiber, depending on the particular fiber structure. For example, for POF having a reinforcing layer, it is possible for the notch to completely or partially penetrate the reinforcing layer. Control samples are easily used to determine an appropriate notch depth for a particular fiber.

According to the invention, therefore, plastic optical fiber is capable of being terminated such that relatively smooth end faces result. Moreover, the termination techniques are easier than conventional techniques used for glass optical fiber. And, even with this reduced complexity, connections between the resultant end faces, without polishing and without index-matching material, are able to exhibit a relatively low loss of less than 1 dB. The termination techniques of the invention therefore ease the overall design and set-up of various systems that use POF, e.g., local area networks, campus systems, and consumer-installed home systems, thereby reducing cost.

The invention will be further clarified by the following examples, which are intended to be exemplary.

EXAMPLE 1

Figure 2:
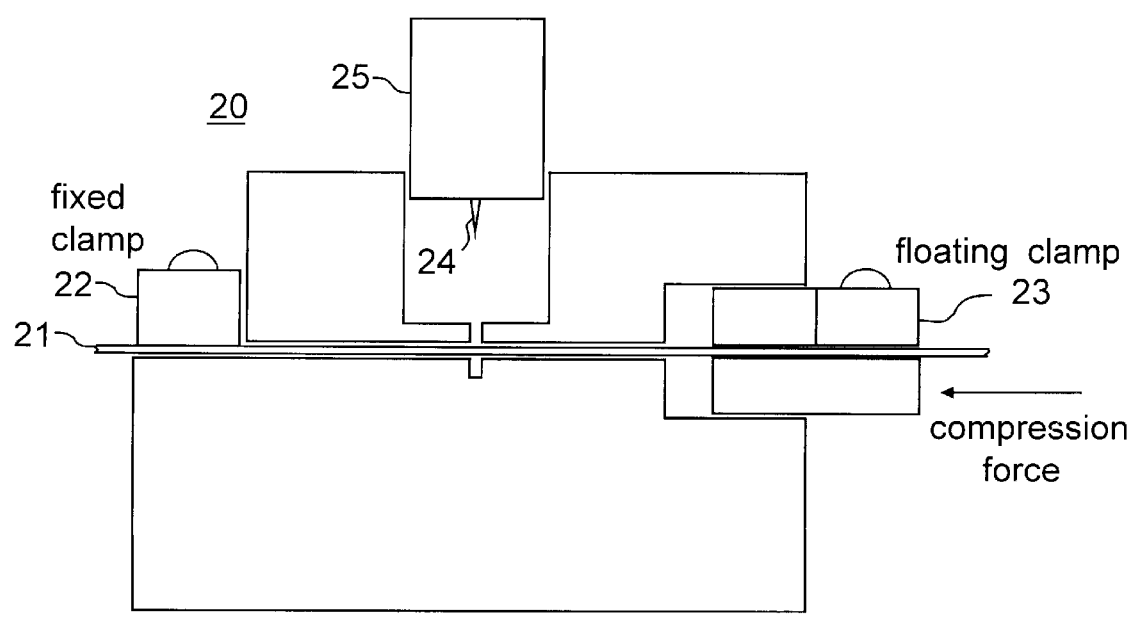
FIG. 2 illustrates a tool useful for terminating plastic optical fiber according to an embodiment of the invention.

A 2.5 m length of a plastic optical fiber with a 235 $\mu$m diameter CYTOP® center section (including both doped and undoped material) and a 500 µm diameter outer polymethylmethacrylate reinforcement was cut in two with a knife. Then, using a tool such as shown in FIG. 2, each fiber was axially compressed near the cut end, under an approximately 1% strain, and a conventional double-edged razor blade was pressed completely through each fiber, removing approximately ½ inch from each fiber's end. These two terminated ends were mated in an alignment sleeve, with the other two ends connected to a 850 µm laser source and a large area photodetector, respectively. The amount of light transmitted was measured and compared to the amount transmitted through the original uncut fiber length. The loss resulting from the connection was about 0.7 dB.

EXAMPLE 2

A length of plastic optical fiber was obtained. The fiber had a 250 µm CYTOP® center section (including both doped and undoped material) with a PMMA reinforcement layer having an outer diameter of 500 microns. A 0.6 m length of experimental POF was obtained by making a small notch perpendicular to the fiber axis. The tip of the blade used to produce the notch had a radius of curvature less than 0.1 micron, and the notch depth was approximately 100 microns. The notched fiber was placed in an Instron controlled-strain apparatus. In this apparatus, two clamps separated by a gauge length of 0.75"applied a longitudinal strain on the fiber. The notch was positioned halfway between the clamps, and the fiber was strained at a rate of 50 inches/minute until breaking at the notch point.

To measure the optical attenuation produced by this termination, the uncleaved end face of one cleaved fiber length (length A) was polished. Another 0.6 m length (length B) of the fiber was obtained by polishing both the cleaved and uncleaved end faces. Fiber length B was coupled to an 850 nm laser source on one end, and the power output at the other end was measured with a large area photodetector. The cleaved end face of fiber length A was then mated with the output end of fiber length B in an alignment sleeve. The power output from the polished end face of fiber A with the large area photodetector was then monitored. The additional loss added to the system by this mating of a cleaved and polished connection was 0.9 dB.

Other embodiments of the invention will be apparent to those skilled in the art from consideration of the specification and practice of the invention disclosed herein.

What is claimed is:

1. A process for fabricating an article comprising a plastic optical fiber, comprising the steps of:
   providing a length of optical fiber;
   inducing axial compression on the length of fiber; and
   cutting the length of fiber while the fiber is under said compression.

2. The process of claim 1, wherein a compressive strain of at least 1% is induced on the length of fiber prior to cutting.

3. The process of claim 1, wherein end faces resulting from the cutting exhibit substantially no branching cracks.

4. The process of claim 1, further comprising the steps of:
   providing a second length of plastic optical fiber;
   inducing axial compression on the second length of fiber;
   cutting the second length of fiber while the fiber is under compression; and
   connecting together end faces of the first and second lengths of fiber resulting from the cutting, by a dry, non-polished technique, wherein the connection exhibits a loss less than 1 dB.

5. The process of claim 1, wherein the cutting is performed by a guillotine technique using a single blade.

6. A process for fabricating an article comprising plastic optical fiber, comprising the steps of:
   placing a plastic optical fiber into a support apparatus, such that the fiber assumes a curvature;
   securing end portions of the fiber;
   pressing a blade onto the fiber between the secured end portions, such that the force of the blade reduces the curvature and the length of the fiber between the secured end portions, the reduced length inducing an axial compressive strain; and
   without removing the compressive strain, pressing the blade into the fiber to cut the fiber.

7. The process of claim 6, wherein the support apparatus has a curved surface that provides the curvature to the fiber.

8. A process for fabricating an article comprising plastic optical fiber, comprising the steps of:
   placing a plastic optical fiber into a support apparatus;
   securing a first end portion of the fiber;
   securing a second end portion of the fiber such that the step of securing the second end portion induces axial compression on a length of the fiber between the first and second end portions; and
   cutting the length of the fiber at a location between the first and the second end portions while the length is under the axial compression.

9. A process for fabricating an article comprising a plastic optical fiber, comprising the steps of:
   providing a length of optical fiber;
   notching the length of fiber;
   pulling at least one end portion of the length to fracture the fiber,
   wherein the pulling is performed at a strain rate sufficient to keep the strain in an elastic region during the fracture, and
   wherein the radius of curvature of the notch is less than 10 µm.

10. The process of claim 9, wherein the radius of curvature is less than 1 µm.

11. The process of claim 10, wherein the radius of curvature is less than 0.1 µm.

12. A process for fabricating an article comprising plastic optical fiber, comprising the steps of:
   providing a first length of plastic optical fiber;
   notching the first length of fiber;
   pulling at least one end portion of the first length to fracture the first length;
   providing a second length of plastic optical fiber;
   notching the second length of fiber;
   pulling at least one end portion of the second length to fracture the second length; and
   connecting end faces of the first and second lengths,
   wherein the pulling is performed at strain rates suitable to provide a loss in the connection of less than 1 dB.

13. A process for fabricating an article comprising plastic optical fiber, comprising the steps of;
   providing first and second lengths of plastic optical fiber;
   terminating the first length to provide first end faces;
   terminating the second length to provide second end faces; and
   connecting one of the first end faces with one of the second end faces such that the resultant connection exhibits a loss less than 1 dB.

14. A process for fabricating an article comprising a plastic optical fiber, comprising the steps of:

providing a length of optical fiber;

notching the length of fiber;

pulling at least one end portion of the length to fracture the fiber, wherein the pulling is performed at a strain rate sufficient to keep the strain in an elastic region during the fracture, and wherein the notch is provided by cutting the fiber to a depth of about 10 to about 30% of the fiber diameter.

15. A process for fabricating an article comprising a plastic optical fiber, comprising the steps of:

providing a length of optical fiber;

notching the length of fiber;

pulling at least one end portion of the length to fracture the fiber;

wherein the pulling is performed at a strain rate sufficient to keep the strain in an elastic region during the fracture;

providing a second length of plastic optical fiber;

notching the second length of optical fiber;

pulling at least one end portion of the length to fracture the fiber;

wherein the pulling is performed at a strain rate sufficient to keep the strain in an elastic region during the fracture; and connecting together end faces of the first and second lengths of fiber resulting from the fracture by a dry, non-polished technique, such that the connection exhibits a loss of less than 1 dB.

* * * * *